United States Patent [19]

Burns et al.

[11] Patent Number: 4,571,671
[45] Date of Patent: Feb. 18, 1986

[54] DATA PROCESSOR HAVING MULTIPLE-BUFFER ADAPTER BETWEEN A SYSTEM CHANNEL AND AN INPUT/OUTPUT BUS

[75] Inventors: Charles S. Burns, Mazeppa; Michael R. Crabtree, Rochester; Dwight A. Gourneau, Rochester; Scott W. Hinkel, Rochester, all of Minn.; George A. Lerom; Michael J. Mayfield, both of Austin, Tex.

[73] Assignee: International Business Machines Corporation, Armonk, N.Y.

[21] Appl. No.: 494,250

[22] Filed: May 13, 1983

[51] Int. Cl.[4] .............................................. G06F 3/00
[52] U.S. Cl. .................................................. 364/200
[58] Field of Search ..................... 364/200 MS File

[56] References Cited

U.S. PATENT DOCUMENTS 4,287,562  9/1981  Darden et al. ..................... 364/200

Primary Examiner—Raulfe B. Zache
Attorney, Agent, or Firm—J. Michael Anglin

[57] ABSTRACT

A data processor has a block-multiplexed system channel coupled to a processing engine and a byte-multiplexed bus coupled to multiple I/O devices. A multi-buffer adapter transfers data by cycle-steal (direct memory access) operations between the channel and the bus. The adapter has multiple buffers switchable to the channel in a burst mode by a channel interface and to the bus in a byte mode by a device-level interface.

11 Claims, 9 Drawing Figures

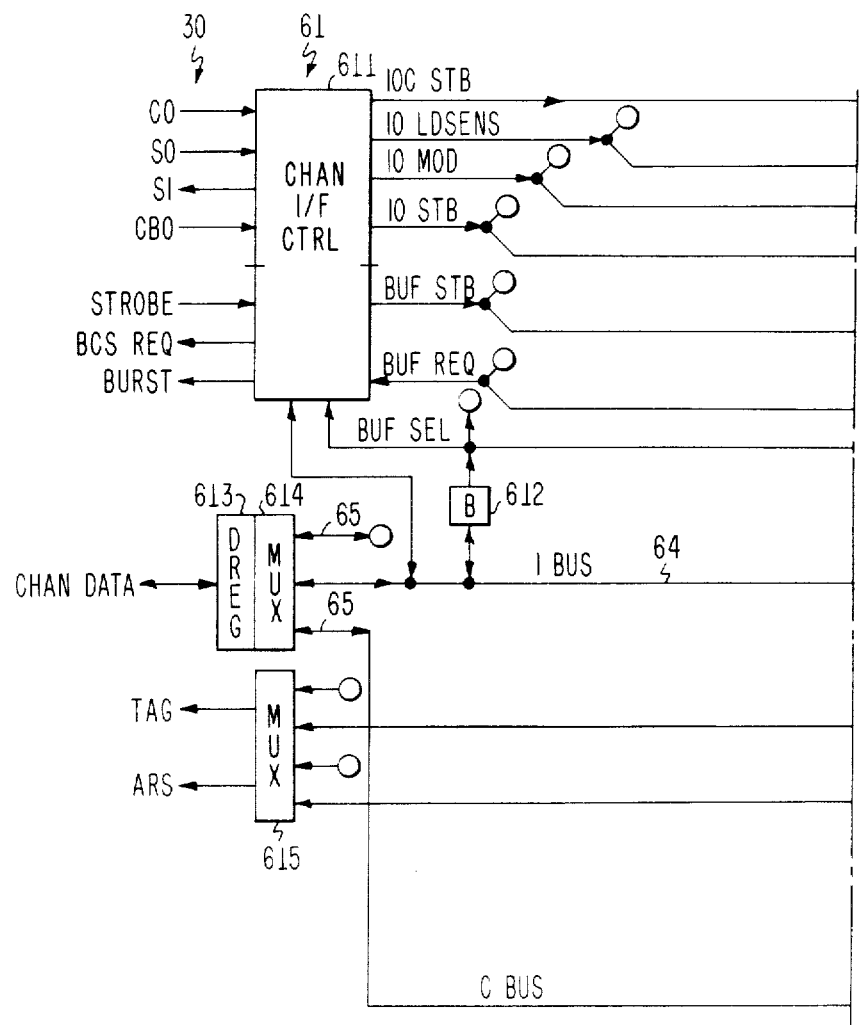
FIG. 2
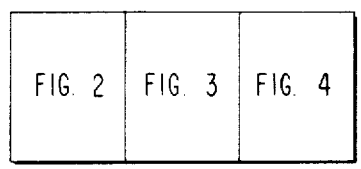

DATA PROCESSOR HAVING MULTIPLE-BUFFER ADAPTER BETWEEN A SYSTEM CHANNEL AND AN INPUT/OUTPUT BUS

BACKGROUND OF THE INVENTION

The present invention relates to automatic data processing, and more specifically concerns apparatus and methods for transferring multi-byte data efficiently by cycle-steal (sometimes called direct memory access or DMA) operations between a processing engine and multiple input/output devices in a data-processing system.

Conventional data processors have input/output (I/O) devices connected to a system channel either directly via a device adapter or in clusters each having a cluster controller. Since the channel has a much higher data rate than any I/O device, each adapter and/or cluster controller commonly includes its own data buffer capable of holding an entire block of data for transfer to or from the channel in a single multi-byte burst. This leads to the use of a large number of such buffers in the processor. Each must be designed to interface to its own device on a byte-by-byte protocol as well as to the common channel on a block-multiplexed (burst-multiplexed) protocol. Each buffer and its protocol translator costs money, consumes power, and occupies board space, even though its usage is much less than full-time. This is a wasteful situation.

SUMMARY OF THE INVENTION

The present invention consolidates the I/O buffering function into a single adapter. Each adapter, however, has multiple buffers, so that more than one device can transfer data to or from a buffer simultaneously. The buffers are automatically switched between those devices currently requiring data transfers, and are automatically switched to the channel to transfer bursts of data. For example, a single multi-buffer adapter (MBA) having two buffers can handle eight disk-drive devices in a typical system, resulting in a savings of 75% of the buffer cost, power, and space. Only one type of buffer need be designed, since all devices now have a single interface to the buffer. A hardware failure in any one buffer will not crash the system, or even an I/O device, because another data path always exists between that device and the channel through another buffer. The invention allows overlapped data operations with multiple I/O devices simultaneously, avoiding idle periods while the channel waits for a device or vice versa; in fact, overlapped operations do not even increase channel-busy time significantly even during the shorter overall duration of the transfers. Moreover, the MBA concept allows the direct, unbuffered transfer of device commands from the channel to any device, for real-time control.

The invention achieves these and other objectives in a processor having a processing engine coupled to a block-multiplexed system channel and a group of I/O devices coupled to a byte-multiplexed device-level bus. (The term "byte" is used to mean a single unit of data, usually eight bits; different devices, however, may have units of different sizes. A "block" or "burst" is an uninterrupted sequence of individual data units, usually as defined by the channel.) A multi-buffer adapter between the channel and the bus has multiple first-in/first-out buffers each holding at least one block of data. A channel interface switches the buffers individually to the channel long enough to transfer an entire block or burst at a time. A device-level interface sequentially switches each of the buffers to the bus so as to interleave individual data units or bytes from (or to) more than one device at a time. An internal bus may also be provided between the channel and device-level interfaces for direct transfer of device commands and for loading and sensing parameters within the MBA.

BRIEF DESCRIPTION OF THE DRAWING

FIG. 2 is a block diagram of the channel interface of a multi-buffer adapter according to the invention.

DESCRIPTION OF THE PREFERRED EMBODIMENT

Figure 1:
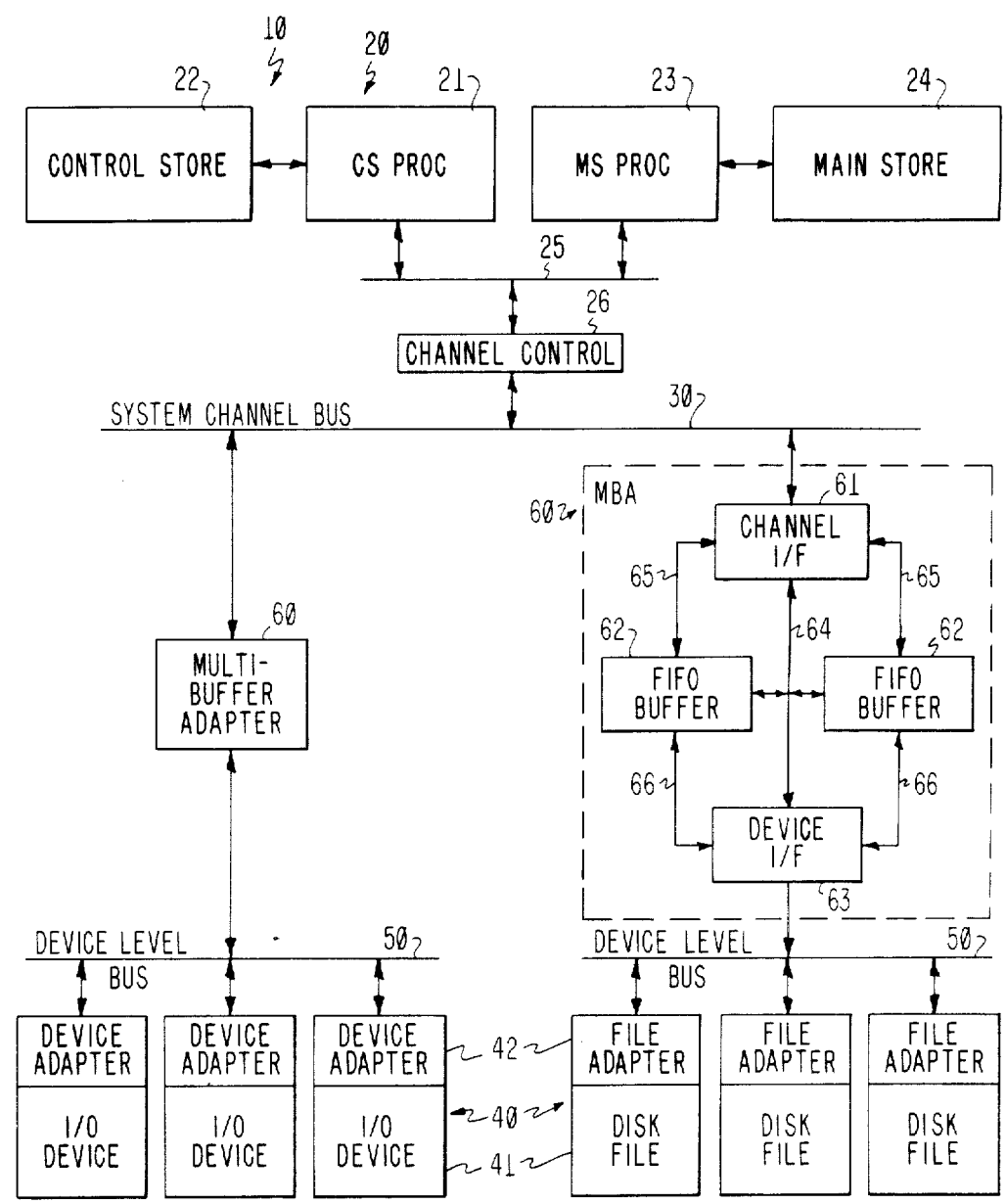
FIG. 1 is a high-level block diagram of a data-processing system including the invention.

FIG. 1 shows a data-processing system 10 in which the invention finds utility.

Processing engine 20 has a control-storage processor (CSP) 21 receiving microcode instructions from a control storage 22. Main-storage processor (MSP) 23 operates upon macro instructions and data in read-write main storage 24. The CSP and MSP interface to a processor bus 25, and to at least one channel controller 26. Processing engine 20, of the type used in the publicly available IBM System/34, is further described in U.S. Pat. No. 4,077,060, to R. E. Bodner and R. C. Kiscaden.

System channel 30 is a bus of individual data, address, and control lines, as will be explained in greater detail below. Controller 26 is the master of the channel. Both 8-bit (byte) and 16-bit (word) parallel data transfers are supported. Although single-word data transfers occur on the channel, the normal mode of data transfer both to and from the processor 20 is by burst-mode block-multiplex cycle steal, in which a burst of 2 to 128 16-bit words is transmitted as a single block of data to/from one I/O device, then another burst to/from another I/O device (or additional data for the same device), and so on. A prioritizer (not shown) in controller 26 is managed by CSP 21 to determine which device is to receive service when conflicts occur.

At the other end of system 10, multiple input/output (I/O) units 40 produce and consume data. Specific I/O devices 41 may include conventional data-entry display terminals, printers, flexible-disk drives, hard-disk drives, and tape drives. Each device has an adapter 42 for converting its specific data and control-signal requirements to a standard format. Each adapter also has an address which identifies it for the receipt or transmission of information.

Device-level (DL) bus 50 couples to each adapter in a group of adapters. Some of the bus lines are common to all adapters, and some are replicated for each individual adapter, as explained below. Only 8-bit (byte) parallel data transfers are supported in this embodiment, although absolute or relative bus width is not directly relevant to the invention. Data transfers on the DL bus are byte-multiplexed. That is, a single data byte from a first device is followed by a single data byte from a second device, and so on, in a series of fixed-length time slots. One slot is designated for device commands rather than for data transfers.

Multi-buffer adapter (MBA) 60 transfers data between system channel 30 and DL bus 50. Its functions include translating the block-multiplex protocol of channel 30 to the byte-multiplex of bus 50 and vice versa, buffering data to accommodate speed differences and device priorities, and providing multiple data paths to handle several ongoing transfers at the same time and to provide graceful degradation of system 10 for hardware failures. More than one MBA can be connected to the channel. Each one has its own DL bus and group of I/O devices. The MBAs are selected by specific addresses on the channel.

Each MBA 60 has a channel interface 61, at least two first-in/first-out(FIFO) buffers 62, and a device-level interface 63. The channel interface receives the lines of system channel 30, and the DL interface receives the lines of DL bus 50. An intermediate I bus 64 ties the two interfaces to each other for direct transfers of device commands from the channel to the DL bus, and for exchanges of internal control signals. The I bus also couples to each buffer for loading buffer parameters, sensing status registers, and switching from one buffer to the other. Bidirectional data transfers between the channel interface and each buffer take place over an 8-bit C bus 65; bidirectional transfers between each buffer and the DL interface occur over 8-bit D bus 66.

Figure 3:
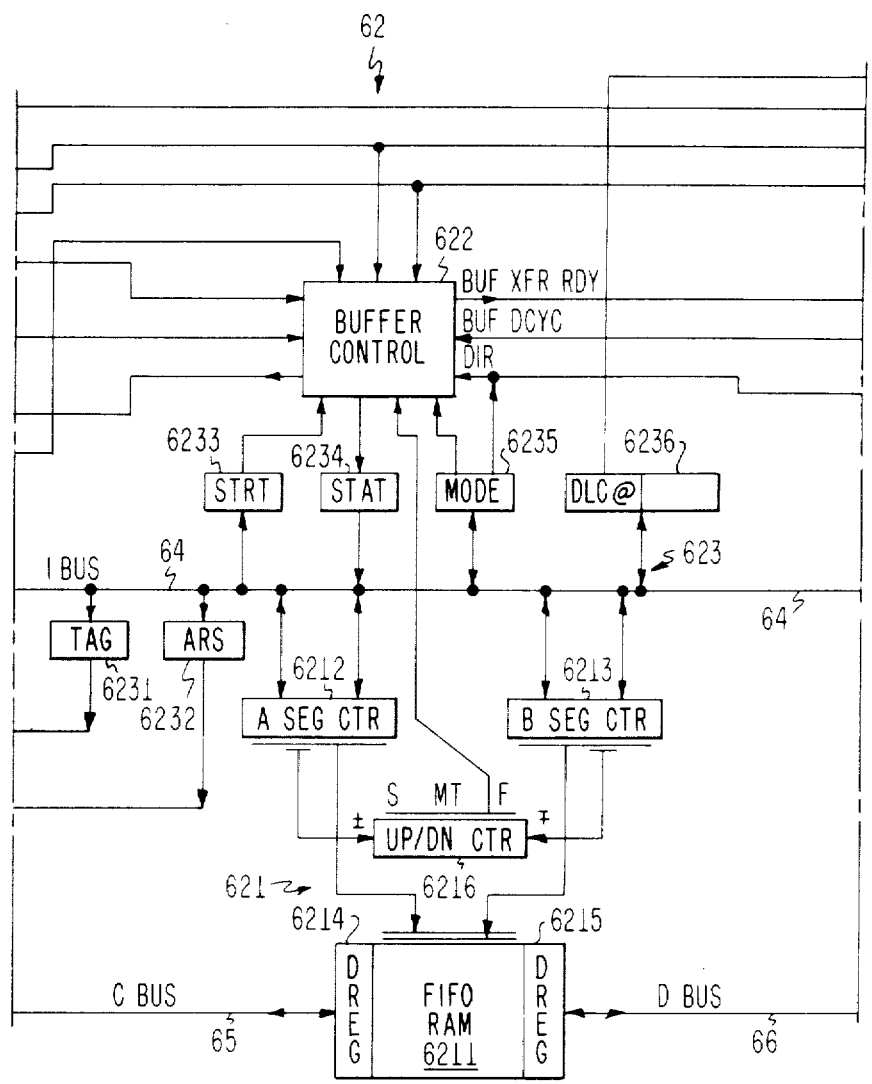
FIG. 3 shows one of the buffer units of the adapter.
Figure 4:
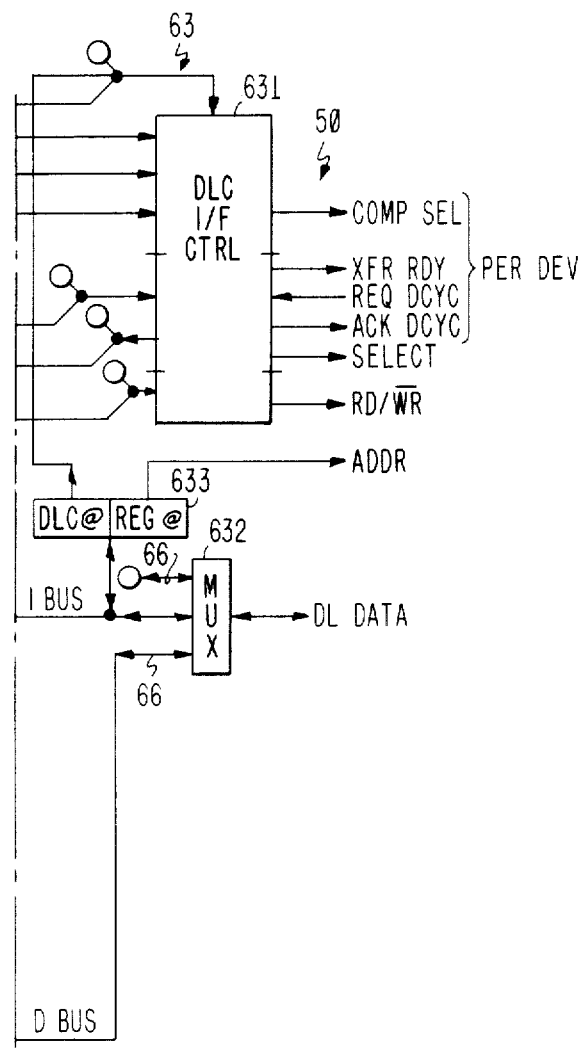
FIG. 4 shows the device-level interface of the adapter.

FIGS. 2–4 show one multi-buffer adapter 60 in greater detail. It will be helpful to place three figures side by side and rotate FIG. 1 a quarter turn counterclockwise to orient the two levels of description with respect to each other. To avoid overredundancy, only one buffer 62 is portrayed. A signal line terminating in a small circle indicated that that line is connected both to the buffer shown and to a corresponding line in the other buffer.

FIG. 2 shows channel interface 61 and the relevant lines of system channel 30. Control Out (CO) initiates a data transfer operation. For multi-byte cycle-steal operations, Service Out (SO) indicates that data will be transferred for each STROBE pulse under SO. Service In (SI) signals the channel that a command byte has been received by a device adapter; for sense operations and cycle steals into the channel, it also signals the availability of data on the Channel Data bus, ARS and Tag lines. Command Bus Out (CBO) carries a three-bit code which, together with CO and SO, identifies the type of data on CHAN DATA. The STROBE signal indicates valid data; it paces the transfer of successive bytes in multi-byte cycle-steal operations. Base Cycle-Steal Request (BCS REQ) can be raised by any I/O device to initiate a cycle-steal operation. Burst Cycle-Steal Request (BURST) signals that the cycle steal is to be a multi-byte operation; up to 256 bytes can be transferred in a single burst.

Channel interface controller 611 contains logic for converting between these signals and a set of internal control signals. I/O C Strobe (IOC STB) indicates valid data on the I bus to/from the DL interface. I/O Load/-Sense (IO LDSNS) determines whether a selected register is to be written. Four I/O Modifier (IO MOD) lines select among various registers in buffers 62 for transferring parameters to and from I bus 64, in connection with IO STB. IO STB is normally the logical inverse of IOC STB. The combination IO STB=0 and IO MOD=1011 loads or senses Buffer Select (B) register 612, a single-bit latch for activating one or the other of the buffers 62. The B register output BUF SEL switches signals within controller 61 as well as within the buffers. The above signals are derived from channel signals CO, SO, and CBO in a conventional manner. SI is produced from the first STROBE under CO in the channel interface. Buffer Strobe (BUF STB) is a data-timing signal derived from the channel STROBE: Buffer Request (BUF REQ) is converted to the channel signals BCS REQ and BURST. Note that controller 61 can also directly transfer data both to and from the I bus for control purposes.

The Channel Data (CHAN DATA) bus has sixteen bit lines for information. During cycle-steal data transfers, it is used as a two-byte-wide bidirectional data bus; it also be used as two one-byte-wide unidirectional data busses carrying data in different directions simultaneously during a channel handshake sequence. A data register 613 converts between two-byte and one-byte data. Three-way multiplexer 614 switches this bidirectional one-byte data between I bus 64 and C buses 65 of the two buffers 62, in accordance with control signal BUF REQ, or from BUF SEL in combination with IO STB, IOC STB, and IO MOD.

The Tag Bus in (TAG) has six lines for signalling various functions and conditions to the channel interface controller 61, including data direction during cycle steals and one-byte or two-byte mode on CHAN DATA. Four Address Register Select (ARS) lines specify which registers in CSP 21, FIG. 1, are to be used to specify the addresses in main store 24 to provide or receive cycle-steal data. A separate set of TAG and ARS lines comes from each buffer 62. Multiplexer 615 switches between the two sets in accordance with which buffer 62 is currently active.

FIG. 3 is a more detailed diagram of one of the buffers 62, FIG. 1. Data flow from the channel 30 data bus to the DL bus 50 data lines proceeds from channel interface 61 over one-byte C bus 65 to a 1024-byte FIFO (sometimes called a queue or silo) memory 621, thence over D bus 66 to DL interface 63 for switching to a one-byte DL data bus. Data flow in the reverse direction occurs in the opposite order along the same path. FIFO memory 621 is of conventional design, using a 1024-byte read/write memory (RAM) 6211 addressed by two-byte A-segment counter 6212 for data input and by two-byte B-segment counter 6213 for data output. Input data comes from either one-byte data register 6214 or 6215, depending upon the direction of the data transfer. The A-segment counter, initially loaded with the starting address of the data to be transferred, increments every time a data byte is written into the RAM, and the B-segment counter, initially loaded with the ending data address, increments every time a data byte is read out. An up/down counter 6216 is incremented and decremented by the A- and B-segment counters respectively. A zero count on lines 6217 therefore indicates that the buffer is empty (MT), while a count of "1023" indicates a full buffer (F). An additional point of interest occurs when the count increases to "128", when the first full block is read in (S).

Buffer controller 622 contains conventional logic for loading and sensing the A- and B-segment counters along with a number of other parameter registers 623, which can be loaded from the I bus or sensed (i.e., read to the I bus), depending upon the state of the IO LDSENS line. The following table shows which registers are addresseed by different combinations of the IO MOD, IOC STB, and IO STB lines.

| IO STB | IOC STB | IO MOD | LOAD | SENSE |
|---|---|---|---|---|
| 1 | 0 | 0000 | SEG HI(6212/6213) | A SEG HI(6212) |
| 1 | 0 | 0001 | A SEG LO(6212) | A SEG ADR(6212) |
| 1 | 0 | 0010 | B SEG HI(6213) | B SEG LO(6213) |
| 1 | 0 | 0011 | — | B SEG HI(6213) |
| 1 | 0 | 1000 | START (6233) | STATUS (6234) |
| 1 | 0 | 1001 | MODE (6235) | MODE (6235) |
| 0 | 1 | 0000 | DLC@/REG@(633) | DLC@/REG@(633) |
| 0 | 1 | 0001 | I BUS to DL DATA | DL DATA to I BUS |
| 0 | 1 | 0100 | DLC@(6236) | DLC@(6236) |
| 0 | 1 | 1011 | B(612) | B(612) |

The TAG 6231 and ARS registers provide parameters to channel 30 concerning the data transfer, as described above; therefore, each buffer 62 has its own set of these registers, activated by switch 615 when BUF REQ selects that buffer. Start register 6233 indicates that the buffer registers 623 have been loaded for a data-transfer operation. Status register receives status bits from the buffer controller, for recording information such as data parity erros, FIFO overrun, and end of data transfer. Mode register 6235 records the type of data transfer taking place, including one bit DIR indicating the direction, i.e. from channel 30 to DL bus 50 or vice versa. Register 6236 is a one-byte register having three bits DLC@ specifying any of eight device adapters 42, FIG. 1, on the DL bus 50; the remaining five bits REG@ specify any one of up to thirty-two registers within the adapter addressed by the DLC@ bits.

FIG. 4 shows device-level interface 63. DL interface controller 631 contains conventional logic for converting channel-interface and buffer signals to DL-bus signals and vice versa. DL bus 50 has a component-select (COMP SEL) signal derived from IOC STB and IO MOD for signalling to a particular device adapter 42, FIG. 1, that it is to receive a command on the DL data lines. Transfer Ready (XFR RDY) indicates that MBA 60 is ready to transmit or receive a block of data to/from a buffer. A device activates Request Data Cycle (REQ DCYC) when it has a cycle-steal data byte to transmit, or is ready to receive a data byte. Acknowledge Data Cycle (ACK DCYC) times each byte of a cycle-steal data transfer. The preceding four lines are duplicated for each device adapter on the DL bus of that MBA. That is, every adapter has its own individual COMP SEL line, and so on, for up to eight different devices. Which one of the devices is to have its line activated or sensed, is specified by the three DLC@ bits from register 6236, FIG. 3. Since a set of DLC@ bits comes from each of the two buffers 62, the state of B register 612, FIG. 2, determines which set is to be given credence. A single Select (SELECT) line is connected in common to all devices on DL bus 50. It strobes each byte of all data and commands appearing on the DL data lines. SELECT, as well as the three signals XFR RDY, REQ DCYC, and ACK DCYC, are functions of the BUFF XFR RDY and BUFF DCYC signals in the buffer controller. SELECT is clocked within each slot to serve as a strobe. Again, the last two signals are duplicated for each buffer 62, the selection between them being made according to B latch 612. A Read/write (RD/-WR) signal, common to all devices, indicates the direction of a data transfer. It is developed from the DIR line of the selected buffer, or from IO LDSENS when COMP SEL is active during command transfer.

DLC@/REG@ register 633 is similar to DLC@ register 6236, except that register 633 also holds five REG@ bits which are output to DL bus 50 as address lines ADDR. These lines are connected in common to choose among the internal registers of the device specified by COMP SEL. The DLC@ bits from register 633 are passed to interface controller 631 during the Command time slot of DL bus 50, described below.

Finally, the bidirectional DL data lines (DL DATA) carry one byte of data in parallel to or from any of the devices on the DL bus. A three-way multiplexer 632 switches the DL data lines to I bus 65 or to one of the buffer D buses 66, depending on BUF DCYC and IOC STB.

Figure 5:
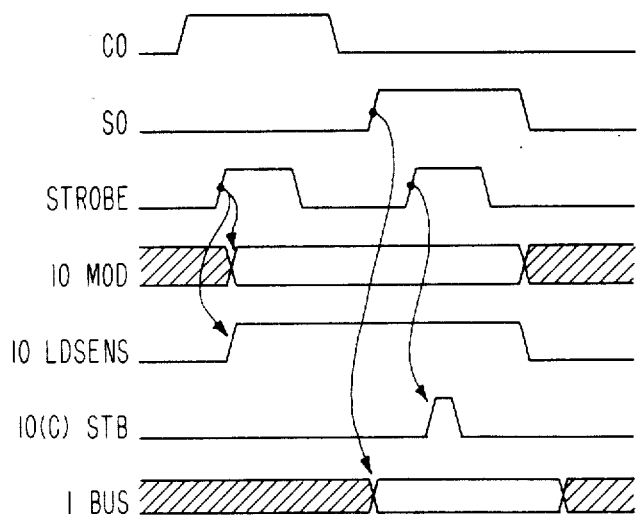
FIG. 5 is a timing diagram describing the loading of parameter registers within the adapter.

FIG. 5 is a timing diagram for loading the parameter registers of FIGS. 2-4. A STROBE pulse under a C0 pulse on channel 30 causes the IO MOD lines to assume the address, derived from CHAN DATA passed to the I bus in the channel interface controller, of the register to be loaded. The IO LDSENS line then rises. (If the register were to be sensed instead of loaded, this line would remain down.) S0 then indicates that the I bus lines, derived from CHAN DTA, are valid. The STROBE under S0 raises either IO STB or IOC STB, depending upon which register is to be loaded, to read the contents of the I bus into the selected register. In the following description, it will be assumed that the proper registers have been loaded for a multi-byte (burst) cycle-steal transfer from a device 40 which has requested service. For example, B 612 is set to select the proper buffer 62, DLC@ 6236 points to the particular device to supply the data, MODE 6235 specifies a multi-byte transfer from DL bus 50 to channel 30, etc.; and finally, setting a bit in START register 6233 starts a transfer.

Figure 6:
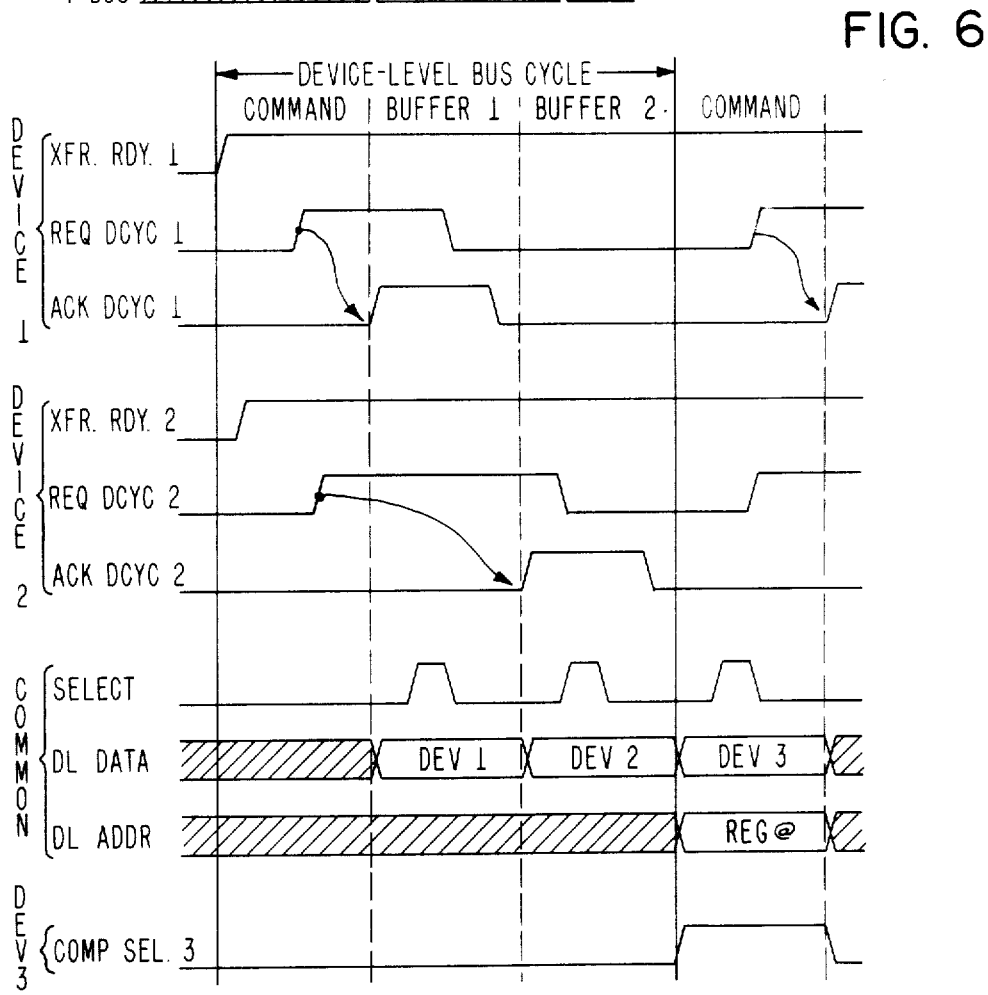
FIG. 6 is a timing diagram showing the byte-multiplexed data-transfer protocol of the device-level bus.

FIG. 6 is a timing diagram showing simultaneous, byte-multiplexed data transfers from two of the devices 40 on a DL bus 50 to the two buffers 62 in MBA 60. Each complete cycle of DL bus 50 has three time slots. The Command slot is for direct transfers of command bytes to any of the eight devices on the DL bus. The Buffer-1 slot is normally assigned to one of the buffers 62, and the Buffer-2 slot is assigned to the other buffer. The uppermost group of three lines are those replicated lines belonging to that device 40 (designated Device-1 in FIG. 6) specified by the DLC@ bits in register 6236 of the first buffer 62; the next group are lines belonging to the device (designated Device-2) specified by the DLC@ bits in the other buffer. The next group are common lines, paralleled into all eight devices. The lowermost line is a replicated line from a third device (designated Device-3) for direct command transfers. The terms Device-1, Device-2 and Device-3 may represent any of the eight devices on the DL bus. For example, Device-1 may be the fifth device on the bus, Device-2 may be the third, and Device-3 may be the sixth; that is, any device can be assigned to Buffer-1, any other device to Buffer-2, and yet a further device can receive a command directly from the channel interleaved with the two data transfers.

At some time before the Buffer-1 slot of one cycle, the XFR RDY1 line signals Device-1 that Buffer-1 is ready to receive data; this line remains high for an entire multi-byte transfer. Device-1 pulses REQ DCYC1 to indicate that the next data byte is read for transmission. At the beginning of the Buffer-1 slot of that cycle and every subsequent cycle while XFR RDY1 is active, ACK DCYC1 enables one byte of data to be transferred on the common DL DATA lines under the SELECT timing strobe. During the Buffer-1 time slot, controller 631 switches the DL DATA Lines to the D bus 66 of the first buffer 62. (Note that SELECT does not appear during a slot when no valid byte exists on the data lines.) At some time before the Buffer-2 slot, a similar sequence occurs for the XFR RDY2, REQ DCYC2, and ACK DCYC2 lines, belonging to Device-2. Multiplexer 632 switches the DL DATA Lines to the second buffer 62 for this slot. The Command slot of the full cycle shown in FIG. 6 is empty; no command was issued to a device during that cycle. The Command slot of the partial cycle at the right of FIG. 6 illustrates a one-byte command transfer. The beginning of the Command slot activates the COMP SEL3 line for Device-3, addressed by the I bus under CO during a STROBE on channel 30. The ADDR lines, from the REG@ register bits, addresses a particular one of up to thirty-two registers in Device-3 to receive the command byte. The command byte itself is transferred directly from the CHAN DATA lines through the I bus to the DL DATA lines, without being delayed in either of the buffers 62. Multiplexer 632 couples the DL DATA lines to the I bus during Command time slots.

While data from any two of the devices are simultaneously being transferred byte-by-byte into buffers 62, a block of data is being read out of one of the buffers to the channel as a continuous 128-byte burst, while the other buffer waits its turn.

Figure 7:
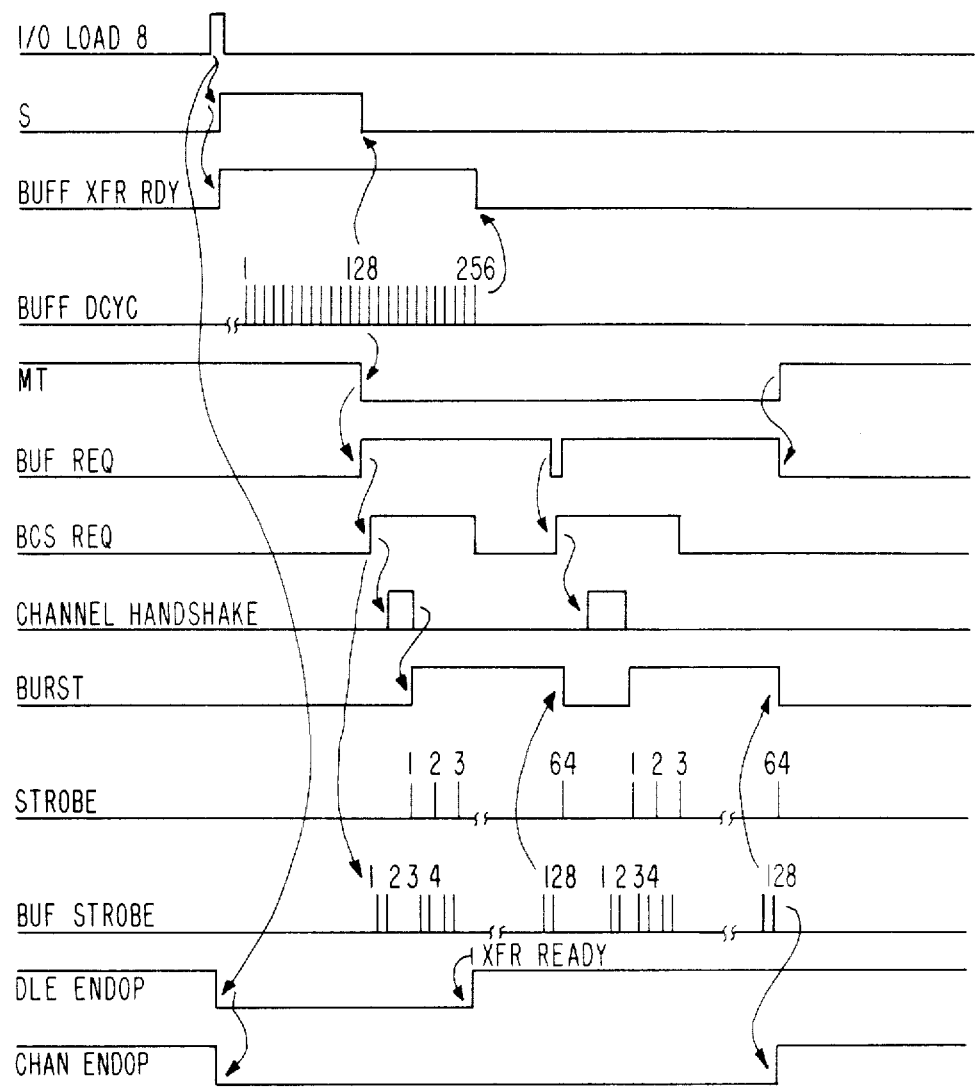
FIG. 7 shows the block-multiplexed protocol of the system channel.

FIG. 7 is a timing diagram for a 256-byte cycle-steal operation consisting of two 128-byte bursts. After the proper registers have been set up, setting an IO LOAD8 bit in START register 6233 resets up/down counter 2616, FIG. 3, activating its S output to indicate the start of the operation. This causes buffer controller 622 to issue BUFF XFR RDY to DL interface controller 631. Controller 631 responds by issuing a separate BUFF DCYC pulse for every data byte transferred from DLC DATA to FIFO 621. When the data for the first 128-byte burst has been completely loaded into the FIFO, S drops, as does the MT output of the up/down counter. This causes controller 622 to drop BUF REQ, which in turn causes controller 611 to raise BCS REQ, thereby to initiate a channel handshake sequence. After the handshake, channel 30 has received all the control information it needs to manage the operation. Controller 611 then raises BURST signalling a multi-byte transfer. Meanwhile BCS REQ has generated two pulses on BUF STB, causing the first two bytes to be transferred from FIFO 621 over C bus 65 and through multiplexer 614; register 613 then assembles them into a single 16-bit word. These bytes are transferred to the CHAN DATA lines when controller 611 receives a first STROBE pulse from the channel. Two more bytes are then readied, and the sequence repeats. When the 128th byte has been transmitted to the channel interface 61, controller 622 drops BUF REQ, causing controller 611 to drop BURST. This ends the first block of data.

When the next block of data has been stored into FIFO 621 and another channel handshake has reaffirmed the priority of that buffer to transmit, the above sequence repeats for the next 128-byte block or burst of data. Since the second burst is the last burst of data to be transferred, MT deactivates BUF REQ and terminates the cycle-steal operation. DLC ENDOP and CHANNEL ENDOP represent two bits in STATUS register 6234, FIG. 3 denoting the end of an operation on the DL bus and the channel, respectively.

Figure 8:
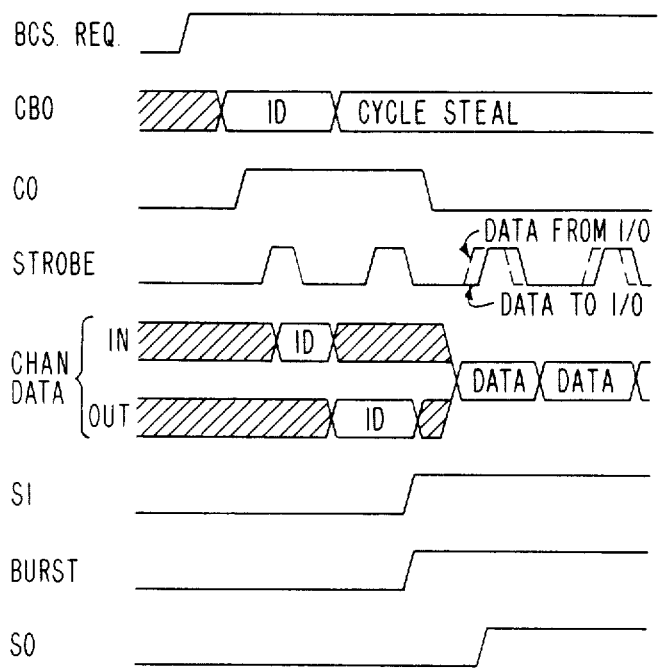
FIG. 8 details the channel-handshake sequence of FIG. 7.

FIG. 8 details the channel handshake sequence of FIG. 7. When BSC REQ is raised as shown in FIG. 7, channel controller 26, FIG. 1, sets CBO=000 as soon as CSP 21 is ready to handle a cycle-steal operation. The first channel STROBE under a CO pulse causes channel interface controller 611 to place on the eight IN lines of CHAN DATA a code identifying which devices 40 require service. (If each of the eight devices is assigned a different bit line of CHAN DATA IN, the data byte contains a "1" for each device needing service, and a "0" for each device not requiring service.) The channel controller 26 determines which device has the highest priority for the next cycle-steal operation, and outputs its identification code on the eight OUT lines of CHAN DATA. MBA 60 converts this to a buffer selection (with BUF REQ) and other necessary information. Meanwhile, channel controller 26 has set CBO=010 to indicate a cycle-steal operation. CO falls, SI and BURST are raised, and the next STROBE pulse raises SO. Thereafter, each pulse on STROBE transfers one word (two bytes) of data on the 16-line CHAN DATA bus. To accommodate register setup times, the STROBE pulses are timed somewhat differently for transfers toward (solid lines) and away from (dashed lines) the I/O devices.

Figure 9:
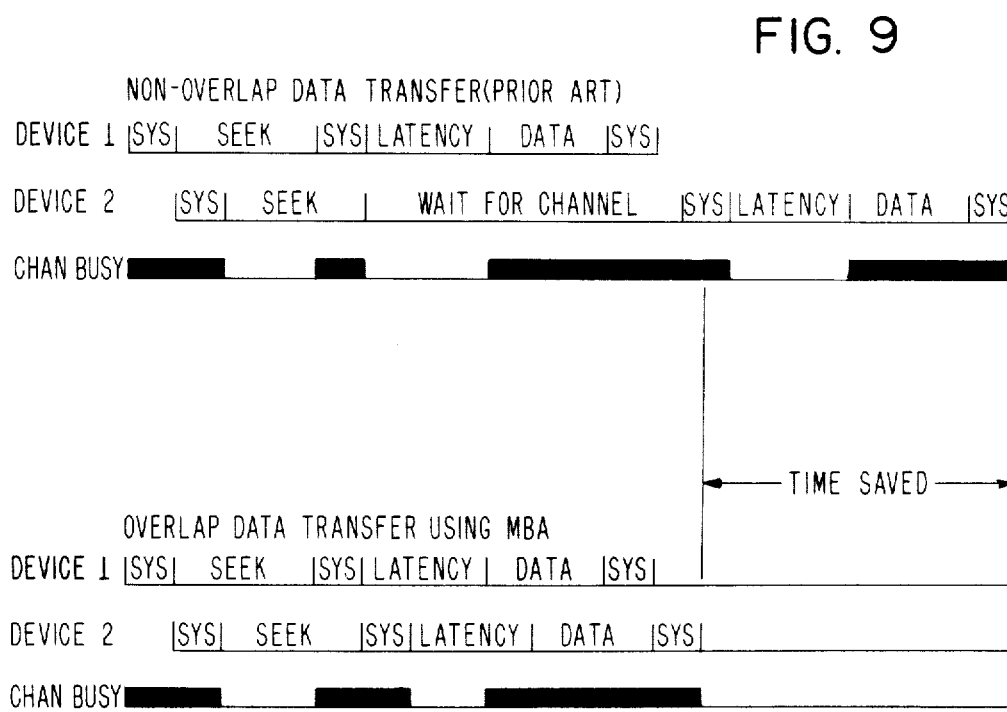
FIG. 9 compares the timings and channel usages between the invention and a prior-art data processor.

FIG. 9 is a timing diagram showing time advantage gained by the present invention. The upper portion of FIG. 9 shows representative non-overlapped multi-byte cycle steal operations involving two devices, as they might occur in a prior-art processing system such as the one shown in U.S. Pat. No. 4,077,060, in which multiple I/O controllers are hung directly on the system channel. The two I/O devices are both assumed to be disk files having seek times to find a particular track on the disk, and Latency times before the disk revolves to bring the proper sector under the read/write head. The Data times are those required for the actual transfer of the data between the file adapters 42 and the processor bus 25, FIG. 1. The System times are overhead intervals required for system-microcode functions to be performed to set up the transfers. The Channel Busy Line portrays the amount—and especially the relative proportion—of time during which the system channel 50 is occupied in achieving the two cycle-steal operations.

The lower portion of FIG. 9 shows the same two operations performed on a system according to the present invention, using a multi-buffer adapter 60. The same technology is assumed, so that System, Seek, Latency and Data times remain the same as those of the prior-art system. The invention slashes more than 35% off the total time required for these typical operations. Also, surprisingly, the proportion of time during which the channel is busy does not appreciably increase.

The embodiment described herein uses two MBAs 60. Any number may be used. Each MBA has two buffers; a greater number is achievable by routine extension of the description. The number of I/O units 40 on each DL bus, and the registers in each, may of course be varied. Relative numbers of these units in a given system depends strongly upon the relative bus bandwidths and device speeds, among other factors. The protocols for channel 30 and DL bus 50 may vary greatly; the only aspects of significance are that one has a multi-device interleaved mode while the other operates in a burst of data from a single device at a time, and that the channel is capable of transmitting the necessary control information to the MBA as well as to the I/O devices. Therefore, these protocols will depend much more upon other system requirements than upon the inclusion of the invention into the system. Different protocols will also naturally have a great effect upon the detailed implementation of the interface controllers 611 and 631. Many other modifications and extensions within the spirit of the invention will also become obvious to those skilled in the art.

We claim as our invention:

1. A data-processing system, comprising:
   a processing engine;
   a system channel coupled to said processing engine and adapted to transfer an entire block of data units in a single burst;
   a plurality of input/output devices;
   a device-level bus coupled to said devices and adapted to transfer interleaved single data units from more than one of said devices at a time; and
   a multi-buffer adapter coupled to said system channel and to said device-level bus, said adapter including
      a plurality of first-in/first-out buffers each adapted to hold at least one of said blocks of data units,
      a channel interface responsive to said system channel for selectively coupling said buffers to said system channel long enough to transfer said entire block of data units between said channel and one of said buffers, and
      a device-level bus interface for sequentially coupling each of said buffers to said device-level bus long enough to transfer an individual one of said data units between said device-level bus and a different one of said devices.

2. The system of claim 1, wherein said multi-buffer adapter further includes
   an internal bus coupled directly between said channel interface and said device-level interface, for immediate transfer of data between said processing engine and said devices.

3. The system of claim 2, wherein each of said buffers includes
   a set of parameter registers selectively loadable from said internal bus.

4. The system of claim 1, wherein each of said buffers includes
   a first-in/first-out memory for transferring data both to and from said channel interface and both to and from said device-level interface, and
   a buffer controller coupled both to said channel interface and to said device-level interface for controlling said memory and for selectively loading said registers.

5. The system of claim 4, wherein said each of said buffers further includes
   a set of registers for specifying variable parameters for data transfers into and out of said memory, said registers being selectively loadable in response to said buffer controller.

6. The system of claim 4, wherein said memory includes
   counter means coupled to said buffer controller for indicating when said memory contains a complete block of said data units.

7. The system of claim 5, wherein one of said registers is a buffer-select register for selectively coupling only a particular one of said buffers to said channel.

8. The system of claim 5, wherein one of said registers is a device-level address register having an output coupled to said device-level bus for specifying one of said devices for a data-unit transfer.

9. The system of claim 1, wherein said device-level interface includes
   a controller for cyclically allocating a sequential time slot for each of said buffers to transfer one of said data units to/from one of said devices.

10. The system of claim 9, wherein said multi-buffer adapter further includes
    an internal bus coupled directly between said channel interface and said device-level interface.

11. The system of claim 10, wherein said device-level interface further includes
    a device-level address register, and
    wherein said device-level interface controller is further adaped to allocate a cyclic command time slot and to couple said internal bus and said address register to said device-level bus during said command time slot.

* * * * *